Sept. 29, 1925. 1,555,364
J. W. GOFF ET AL
SPEED RESPONSIVE DEVICE
Filed Sept. 18, 1922  2 Sheets-Sheet 2
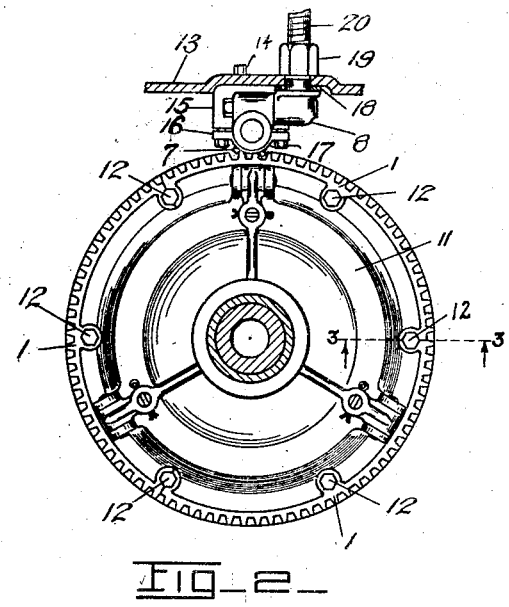
Fig_2_
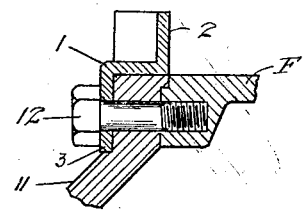
Fig_3_
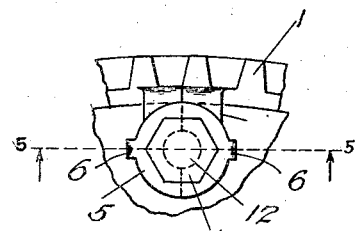
Fig_4_
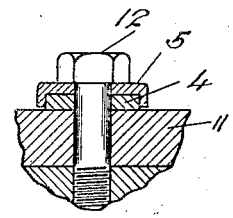
Fig_5_
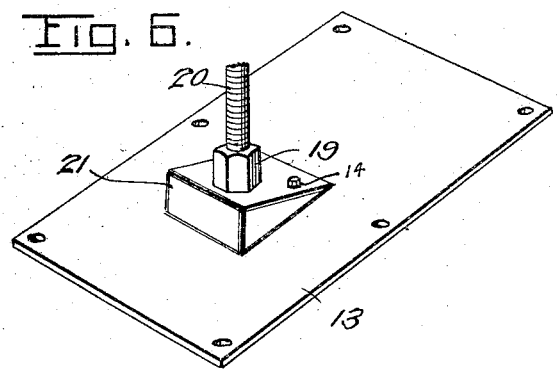
Fig. 6.
Inventors
JOHN W. GOFF
ALLEN T. SULLIVAN
DELL J. SULLIVAN
By Cutherley & Kessenich
Attorney Patented Sept. 29, 1925.

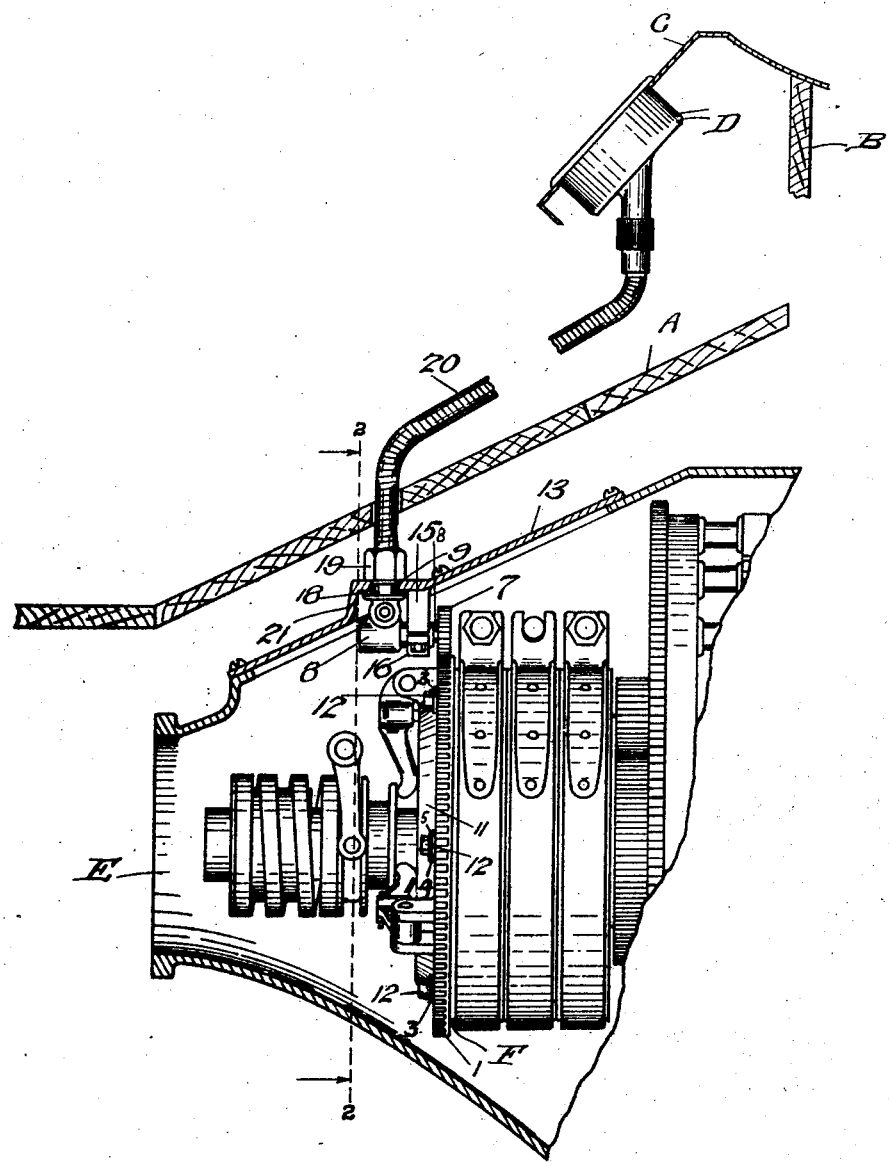

1,555,364

UNITED STATES PATENT OFFICE.

JOHN W. GOFF, ALLEN T. SULLIVAN, AND DELL J. SULLIVAN, OF ST. PAUL, MINNESOTA.

SPEED-RESPONSIVE DEVICE.

Application filed September 18, 1922. Serial No. 589,002.

*To all whom it may concern:*

Be it known that we, JOHN W. GOFF, ALLEN T. SULLIVAN, and DELL J. SULLIVAN, citizens of the United States, residing at St. Paul, in the county of Ramsey and State of Minnesota, have invented certain new and useful Improvements in Speed-Responsive Devices, of which the following is a specification.

Our invention relates to speed responsive devices and more particularly it has reference to a novel method of actuating the same from a standard part of an automobile and enclosing the working parts within the transmission case of an automobile engine.

Speedometers heretofore employed are usually driven from the front wheels of a vehicle by means of suitable reduction gears mounted on the steering knuckle and a flexible shaft. This arrangement exposes the gears and swivel joint to the action of the elements and to accidents, renders them noisy and undurable, and communicates the vibration from the wheels to the elements of the speedometer.

The principal objects of our invention, briefly stated, are: First, to associate the actuating elements of a speedometer with the driving plate of the transmission drum of an engine; second, to utilize the transmission case to enclose the gears and swivel joint to protect them from accident and exposure; third, to position the gears where they may run in oil already provided, thus reducing noise and friction, and rendering them more durable; fourth, to reduce vibration by shortening the speedometer drive shaft and by removing the gears and swivel joint from the influence of the wheels; fifth, to construct the various parts so that they may be applied within the limited working space of the transmission case; sixth, to reduce the cost and time of installation and the operating expense, and; seventh, to modify the cover plate of the transmission case to accommodate the device.

To these and other ends, our invention consists in the construction, arrangement and combination of parts described hereinafter, illustrated in the drawings, and pointed out in the claims forming a part of this specification.

One embodiment of our invention is represented by way of example in the accompanying drawings, wherein:—

Figure 1, is a side elevation showing our invention applied to an engine,

Figure 2, is a front elevation taken on the line 2—2 of Figure 1 and showing the segmental arrangement of the ring gear.

Figure 3, is a sectional detail view taken on the line 3—3 of Figure 2 with the washer omitted.

Figure 4 is a plan detail view of a portion of the ring gear showing the terminals of adjacent segments, Figure 5 is a section taken on the line 5—5 of Figure 4, and, Figure 6, is a perspective of the transmission case cover plate.

Like characters of reference refer to like or similar parts throughout the several views of the drawings in which:—

(A) designates the floor of an automobile, (B) the dash, (C) the cowl, which is adapted to retain a speedometer recorder (D), and (E) the transmission case of the engine. The transmission drum (F) includes the usual driving plate (11) attached by means of screw bolts (12). These elements are conventional and form no part of our invention.

A ring gear (1) having a continuous flange (2) is preferably formed of three segments, each segment provided in its center with a depending lug (3) and on its terminals with mating recesses (4). The segments are secured to the outer periphery of the driving plate (11) by means of the screw bolts (12) which form a part of the initial equipment of the engine and which penetrate the transmission drum (F) to hold the driving plate in place. If desired, the bolts (12) may be replaced by similar bolts of a greater length. Adjacent segments are positively held together by the interposition of washers (5) having oppositely disposed projections (6) (see Fig. 4) which are bent downwardly to firmly clamp the mating recesses (4) of adjacent terminals, as clearly shown in Figure 5. In this manner the segments of the ring gear (1) may be readily manipulated and affixed within the limited space of the transmission case.

A pinion gear (7) meshing with the ring gear (1) is carried by a swivel joint (8), a projecting portion of which is inserted in an opening (9) in a transmission case cover plate (13). Depending from the cover plate (13) and secured thereto by bolts (14) is a bracket (15) partly embracing the swivel joint (8). Another bracket (16) secured to bracket (15) by bolts (17) surrounds the lower side of a portion of the swivel joint (8) thereby completing the support which insures operative engagement of the gear (7) with the ring gear (1).

The projecting portion of the swivel joint (8) carries a felt washer (18) to prevent the escape of oil through the opening (9) in the transmission case cover plate (13). A nut (19) seated against the outer face of the cover plate (13) unites the projecting portion of the swivel joint in the opening (9) and a speedometer drive shaft (20) and also serves to maintain the felt washer (18) in place.

In order to permit the swivel joint (8), bracket (15) and gear (7) to be held in alignment with the ring gear (1), the cover plate (13) is formed with a dormer extension (21) as illustrated in Figure 6.

The operation of the device will be readily apparent from the foregoing description.

While in the foregoing, there has been illustrated and described such combination and arrangement of elements as constitute the preferred embodiment of our invention, it is nevertheless desired to emphasize the fact that interpretation of the invention should only be conclusive when made in the light of the subjoined claims.

We claim:

1. In a speed responsive device including driving and driven elements, the driving element comprising a flanged segmental ring gear, each segment having a centrally disposed lug and mating recesses on its terminals, said recesses adapted to embrace the driving plate bolts of an engine, and hooked washers mounted on certain of said bolts for locking the mating recesses of adjacent segments.

2. In combination with the transmission case cover and driving plate of an engine, a speedometer actuating mechanism comprising a driving and a driven element, and a dormer extension formed in the transmission case cover for housing the driven element.

3. In combination with the transmission case cover and driving plate of an engine, a speedometer actuating mechanism comprising a driving and a driven element, the driving element adapted to be carried by the driving plate of the engine, and the driven element including a pinion gear and a swivel joint supported by a bracket depending from the transmission case cover.

4. In combination with the transmission case cover and driving plate of an engine, a speedometer actuating mechanism comprising a driving and a driven element, the driving element including a segmental ring gear adapted to be detachably carried by the driving plate of the engine, and the driven element including a pinion gear and a swivel joint normally supported in a fixed position relative the driving element by a bracket depending from the transmission case cover.

5. A speedometer drive comprising, in combination, a sectional gear adapted to be secured to the drive plate of an automobile, each section having a recess therein for reception of the journal lugs carried by said plate, a driven gear carried by the inspection plate adapted to be secured to the inspection opening of the housing of the transmission, and means for actuating a flexible shaft by said driven gear.

6. A speedometer drive comprising, in combination, a drive plate having journal lugs thereon, a journal gear formed of like annular segments, each having a recess for passage of said journal lugs, said segments secured to said drive plate by stud bolts which secure the drive plate to the transmission, an inspection opening cover plate, a driven gear journaled in said cover plate, flexible shaft driving means coacting with said driven gear and carried by said cover plate.

7. In a drive mechanism for an automobile accessory, in combination with a transmission driving plate, a master gear wheel applied to said plate overlapping the periphery thereof, said gear wheel having inwardly extending attaching means overlapping a side of the plate, and a driving connection from said gear wheel to the accessory.

8. In a drive mechanism for an automobile accessory, in combination with a transmission driving plate, a transmission casing having an inspection opening, a master gear wheel formed in sections for passage through said opening, said master gear wheel being in contact with the periphery of said driving plate, attaching lugs integral with the sections of the master gear wheel and spaced nearer one side thereof than the other and overlapping said driving plate at one side, the fastening means of the driving plate passing through said attaching lugs, and a driving connection from said master gear to the accessory.

In testimony whereof, we affix our signatures hereto.

JOHN W. GOFF.
ALLEN T. SULLIVAN.
D. J. SULLIVAN.